United States Patent
Nivon et al.

(10) Patent No.: US 11,354,013 B1
(45) Date of Patent: Jun. 7, 2022

(54) LOCATION-BASED ASSET EFFICIENCY DETERMINATION

(71) Applicant: Skydio, Inc., Redwood, CA (US)

(72) Inventors: Hervé Nivon, Paris (FR); Guillaume Richer, Paris (FR)

(73) Assignee: Skydio, Inc., Redwood City, CA (US)

( * ) Notice: Subject to any disclaimer, the term of this patent is extended or adjusted under 35 U.S.C. 154(b) by 65 days.

(21) Appl. No.: 15/932,288

(22) Filed: Feb. 16, 2018

Related U.S. Application Data

(60) Provisional application No. 62/460,222, filed on Feb. 17, 2017.

(51) Int. Cl.
| | |
|---|---|
| *G06F 3/04817* | (2022.01) |
| *G06F 3/04845* | (2022.01) |
| *G06F 3/04842* | (2022.01) |
| *G06V 20/54* | (2022.01) |

(52) U.S. Cl.
CPC ...... *G06F 3/04817* (2013.01); *G06F 3/04842* (2013.01); *G06F 3/04845* (2013.01); *G06V 20/54* (2022.01)

(58) Field of Classification Search
CPC .............. G06F 3/04842; G06F 3/0481; G06F 3/04817; G06F 3/04845; H04L 43/045; H04L 43/08
See application file for complete search history.

(56) References Cited

U.S. PATENT DOCUMENTS

| | | | |
|---|---|---|---|
| 9,489,839 B2 * | 11/2016 | Nerayoff | G06K 9/6201 |
| 9,858,480 B2 * | 1/2018 | Nerayoff | G08G 1/143 |
| 2009/0067725 A1 * | 3/2009 | Sasakawa | G06T 7/246 |
| | | | 382/190 |
| 2011/0041088 A1 * | 2/2011 | Mason | G06F 3/04817 |
| | | | 715/767 |
| 2012/0226390 A1 * | 9/2012 | Adams | G07C 5/008 |
| | | | 701/1 |
| 2013/0016106 A1 * | 1/2013 | Yip | G06T 11/206 |
| | | | 345/440 |
| 2013/0166188 A1 * | 6/2013 | Zheng | G08G 1/0112 |
| | | | 701/117 |
| 2014/0362082 A1 * | 12/2014 | Schpok | G06T 17/05 |
| | | | 345/427 |
| 2015/0161827 A1 * | 6/2015 | Getchius | G07C 5/02 |
| | | | 701/519 |
| 2015/0193994 A1 * | 7/2015 | McQuade | G07C 5/0825 |
| | | | 701/29.3 |
| 2015/0220869 A1 * | 8/2015 | Spencer | G06Q 10/06395 |
| | | | 705/7.41 |

(Continued)

*Primary Examiner* — Matthew Ell
*Assistant Examiner* — Kenny Nguyen
(74) *Attorney, Agent, or Firm* — Young Basile Hanlon & MacFarlane, P.C.

(57) ABSTRACT

Methods, systems and apparatus, including computer programs encoded on computer storage media for determining asset efficiency. Unmanned Aerial Vehicles (UAVs) may be used to obtain aerial images of locations, property or structures. The aerial images may be geo-rectified, and a orthomosaic, digital surface model, or a point cloud may be created. In the context of an operation where mobile assets are used, such as construction or earth moving equipment, location-based event information may be obtained. The system determines efficiency clusters for particular assets, and provides an exploration interface to present and navigate via the efficiency cluster.

29 Claims, 15 Drawing Sheets

(56) References Cited

U.S. PATENT DOCUMENTS

| | | | |
|---|---|---|---|
| 2015/0293071 A1* | 10/2015 | Chisholm | G01N 33/241 |
| | | | 702/6 |
| 2016/0078759 A1* | 3/2016 | Nerayoff | G06V 20/593 |
| | | | 701/3 |
| 2016/0180030 A1* | 6/2016 | Gunawardena | G06Q 50/22 |
| | | | 705/2 |
| 2016/0224206 A1* | 8/2016 | Sun | G06F 9/445 |
| 2016/0337205 A1* | 11/2016 | Nagahama | H04L 41/22 |
| 2017/0024938 A1* | 1/2017 | Lindsay | G07C 5/02 |
| 2017/0039424 A1* | 2/2017 | Nerayoff | G06T 7/32 |
| 2017/0263120 A1* | 9/2017 | Durie, Jr | G08G 1/205 |

* cited by examiner

LOCATION-BASED ASSET EFFICIENCY DETERMINATION

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Unmanned Aerial Vehicles (UAVs) may be used to obtain aerial images of locations, property or structures. The aerial images may be geo-rectified, and an orthomosiac, digital surface model, or a point cloud may be created. In the context of an operation where mobile assets are used, such as construction or earth moving equipment, location-based event information may be obtained.

SUMMARY

Particular embodiments of the subject matter described in this specification can be implemented so as to realize one or more of the following advantages.

In general, one innovative aspect of the subject matter described in this specification can be embodied in a system, computer readable media and methods that include obtaining idle time information for a multiple vehicles. The idle time information includes geo-spatial location information, and event information of the vehicles. The system aggregates the idle time information into multiple segments based on a predetermined criteria, such as a distance threshold for a vehicle, a type of vehicle, predetermined or user-define zones or areas. The system will present, via a user interface, a map or one or more satellite or aerial images of a location. And will present, via the user interface, one or more idle cluster representations of the of vehicles on the map or the images. The idle cluster representation includes multiple segments representing a temporal-based idle amount for the plurality of vehicles.

An interactive user interface is configured to display a geographic area, such as a map or aerial images. The user interface displays idleness information associated clusters of vehicles. Clusters representations are positioned at locations within the geographic area based on location information associated with the vehicles. Idleness information describing an extent to which the clustered vehicles were idle are displayed via a graphical user affordance. The user interface responds to input allowing zooming in and out of the geographic area. In response, the interactive user interface displays idleness information associated with updated clusters adjusted based on the modified zoom. Cluster representations are depicted via a graphical object, such as a circular ring. The cluster representation may be displayed with multiple segments. For example, in one embodiment segments represent a temporal-based duration of a state or event of the mobile assets included in the cluster.

In another innovative aspect of the subject matter described in this specification there is a system, computer media and method for determining geographic structures using a digital surface model generated from aerial images by an unmanned aerial vehicles, and determining that certain objects or surface structures, such as roads, lanes, mounds, hills, embankments, trees, buildings, etc. are causing idleness of vehicles by evaluating location-based event data of mobile assets to the 3-dimensional digital surface model.

DETAILED DESCRIPTION

Figure 1:
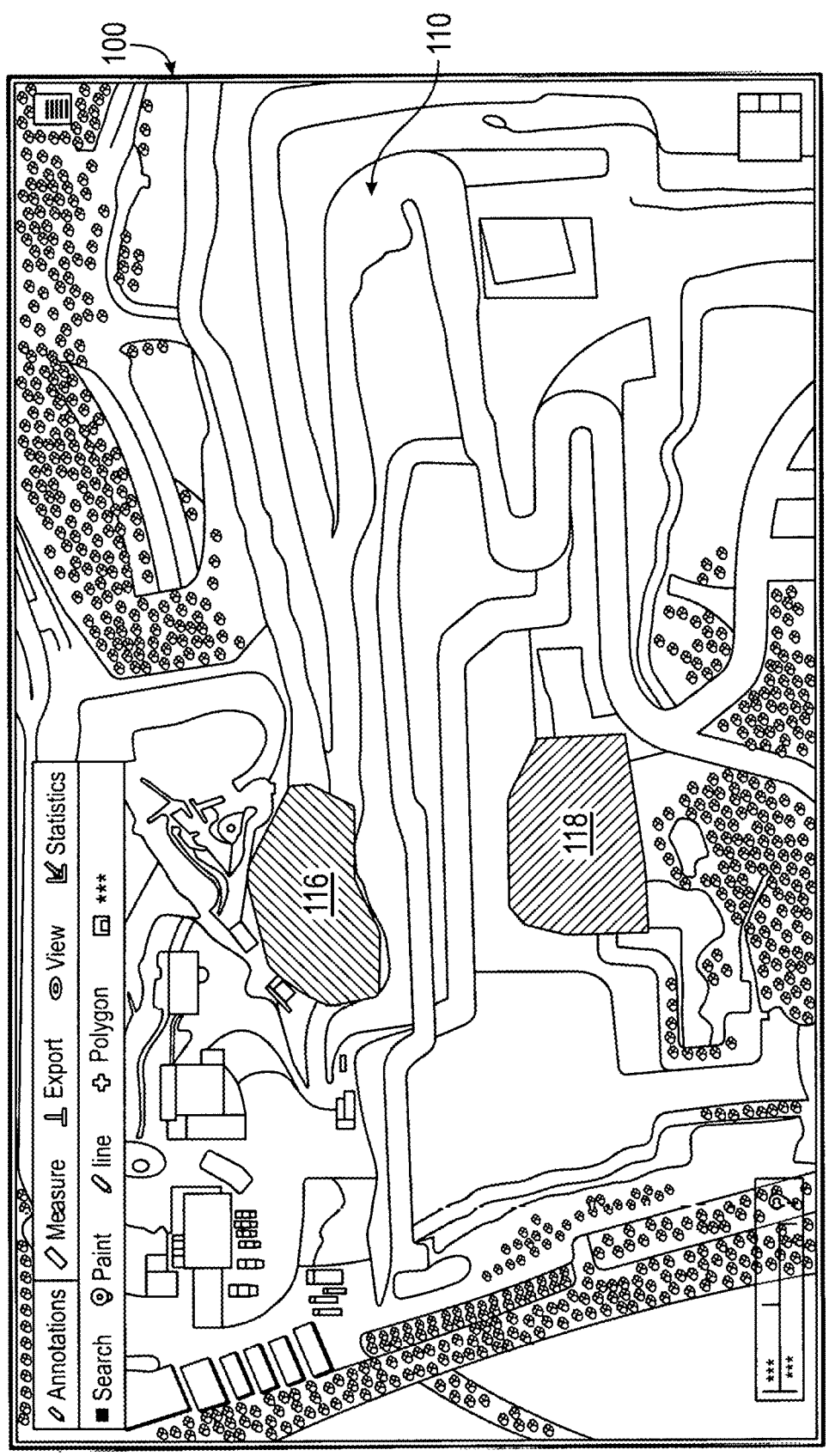
FIG. 1 illustrates an exemplary user interface.

This specification describes a method and system for determining location-based asset utilization. Unmanned Aerial Vehicles (UAVs) may be used to obtain aerial images of locations, property or structures. The aerial images may be geo-rectified, and a orthomosiac, digital surface model, or a point cloud may be created. In the context of an operation where mobile assets are used, such as construction or earth moving equipment, location-based event information may be obtained. A system (e.g., a system of one or more computers, a system of one or more processors such as a user device) determines efficiency clusters for particular assets, and provides an exploration interface to present and navigate via the efficiency cluster.

The system obtains information about asset operations. The assets, such as vehicles, generate events with an associated geo-spatial position. The event data may be collected directly from onboard vehicle sensors and transmitted to the system for storage in a database or other storage repository. Optionally, the event data may be collected by another system and then provided to the system described herein.

The system receives vehicle operation information from multiple vehicles. The vehicle operation information includes a state of the vehicle at a particular time and a particular location. The state of the vehicle may be represented as an event type for the vehicle. The vehicle operation information includes unique identification numbers or values for each of the respective vehicles. Additionally, vehicle segment information is determined based on the geo-spatial location of where the event occurred. Or provided directly from the vehicle. The system determines a vehicle cluster based on the event type and the event location. The user interface presents a map or one or more satellite or aerial images of the location where the events of the vehicles occurred. After determining the vehicle cluster, the user interface display a vehicle cluster representation over the map or images. The vehicle cluster presents both an informative representation, and a user interface navigation control, as further described herein. In response to an input to navigate the vehicle cluster representation, the system determines two or more sub-clusters that represent the original main vehicle cluster representation. In other words, in response to the the input, the system determines the vehicles that comprise the sub-clusters.

Table 1 illustrates an exemplary database (e.g., database table) usable for determining event information of a mobile asset, such as earth moving equipment or other construction equipment.

TABLE 1

| Asset ID | State | Event | Duration | Date/Time | Location |
|---|---|---|---|---|---|
| VEH123 | Empty | Idling | 360 seconds | Feb. 1, 2016 12:02:10 | Latitude/ Longitude |
| VEH123 | Empty | Moving | 750 seconds | Feb. 1, 2016 12:08:10 | Latitude/ Longitude |
| VEH124 | Empty | Idling | 1200 seconds | Feb. 1, 2016 12:02:15 | Latitude/ Longitude |
| VEH124 | Empty | Moving | 650 seconds | Feb. 1, 2016 12:22:15 | Latitude/ Longitude |
| VEH125 | Loaded | Idling | 420 seconds | Feb. 1, 2016 14:35:20 | Latitude/ Longitude |
| VEH125 | Loaded | Moving | 540 seconds | Feb. 1, 2016 12:42:20 | Latitude/ Longitude |

Asset information is identified based on a unique identifier for the asset, such as a an Asset ID. The identifier allows tracking of information for specifics asset. An event type is also captured for the asset. The event type time information, such as a date and a time the event occurred, and duration of the event, and geospatial location of where the event occurred. Other tables can be used to look up the type of asset based on the unique identifier. For example, VEH123 may be associated with an asset type of dump truck. During the course of operation, multiple events may be collected for a dump truck. The assets will experience multiple events, and these events may be captured by onboard systems of the asset, and transferred to a system for event collection. While multiple events may be analyzed, we will focus on an idling event type. Other event types may also be captured, for example, moving, operating, lifting, turning climbing, descending, loading, unloading, transporting, engine off, emission amount, etc. With regard to an idling event, a particular vehicle may be monitored for efficiency, or use. To maximize the use of a vehicle, ideally the vehicle should not sit idle, staying in place with the engine running, and consuming fuel.

Referring to FIG. 1, an exemplary user interface is shown. The user interface may be presented on a user device of a user, such as a laptop, tablet, mobile device, wearable device, display of a system, and so on. Optionally the user device, system, and so on, may receive touch-interactions and/or detect a pressure or force applied to a display of the user device, system, and so on. The user interface 100 may display a map, or ortho-rectified images 110. The ortho-rectified images for example, may have been taken by an Unmanned Aerial Vehicle (UAV) (e.g., the UAV may have navigated over an area capturing images), and the system may use a photogrammetry process to associate geospatial positions to various points about the image. A user of the system may select or draw polygons via the user interface to identify an area of interest. For example, a user may be interested in segment analysis, and the utilizatinn of an asset for a particular segment.

As shown in FIG. 1, two polygons have been drawn, a first polygon 116 is displayed in orange, and a second polygon 118 is displayed in green. In this example, the first polygon 116 represents a load area, and the second polygon 118 represents a dump area. The user interface may present a drawing tool with different colors of polygons based on different area types. The area type is a location or zone where an asset is to perform a particular action such as loading, hauling, dumping, etc. The listing zones is not meant to be limiting, and other zones types may be identified for a particular geographic area. In the exemplary case, the user interface may present a selection such that the user of the system, may select a polygon draw option for load, haul, dump or other areas of interest. The various area selections may be associated with different colors, shading, transparency, etc. In other embodiments, the user interface provides the user a general selection option for a polygon.

While the particular areas or zones may be drawn via the user interface. The areas or zones may be systematically determined by searching the various event data for respective data. For those events asset information may be identified, and then displayed according to their respective geo-spatial information. Also, the system may be configured where an area is defined as a zone of a particular type, such that the system would recognize that activity or movement of a mobile asset in that geo-spatially defined zone would be of a particular type. For example, the system allows the designation of an area as a Dump area, Haul area or Load area. Any event data located in either area, based on a comparison of the event latitude/longitude, to the geo-spatial area would respectively identify that event with the area type. For example, an event may have a specific geo-spatial location of where the event occurred, and the system determines that the geo-spatial location falls within an area defined as Haul. The system, then when presenting cluster information would display the event data when a Haul action is chosen, or selected.

For example, and with respect to Table 1 included above, six event records may exist with data records indicating information for a different asset, for example four dump trucks. The machine serial numbers for illustrative purposes may be VEH123, VEH124, and VEH125. Each of the records would have an event type of "Idling" indicating that the assets are in an idling state for a particular duration, at a geographic location. The table or database or event data may also include state of the asset, for example in each of the records the event is set as "Loaded", indicating that the vehicle is in a loaded state. In other words, that the dump trump is carrying a load. The record would have a particular date, say Feb. 1, 2016, each with its particular time of day, and a duration of the event, and a particular latitude/longitude. The system may perform a search against the database for a particular time period, for example Feb. 1, 2016. The three records would be retrieved, and the respective asset display in a cluster according to the respective event type, and state. The system would combine the three Idling vehicles and combine them into a "Dump" cluster for a particular zone either drawn onto the map or images, or combine them into a "Dump" cluster for a particular location established by the system as a "Dump" zone, or area.

Figure 2:
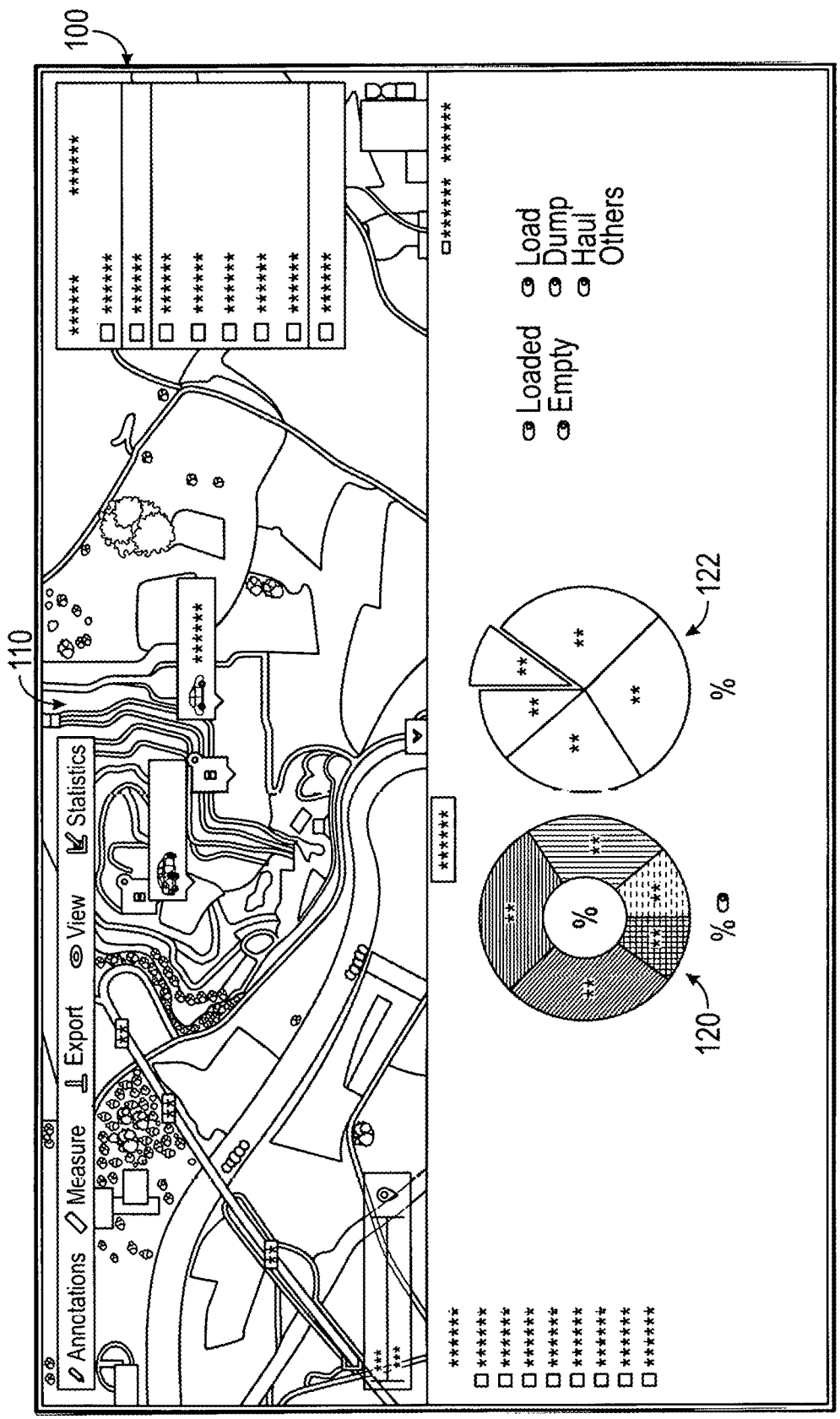
FIG. 2 illustrates an exemplary user interface.

Referring to FIG. 2, an exemplary user interface is shown. The user interface 100 may display a map, or ortho-rectified images 110. A graphical user affordance, such as toggle, switch, check box, etc. 132 may be displayed allowing the user to select information associated with the particular state or segment to be displayed. This user affordance may be dynamically generated by searching the respective database columns, and identifying the column data values. A user affordance for each data value may be presented. Thus, allowing germane information to be analyzed and presented to the user via the user interface. In the illustrated user interface 100, switches 132 for the states "Loaded" and "Empty" are displayed, and switches for the zone "Load", "Dump", "Haul" and "Other" are displayed. These switches control the data selected from the database as represented in Table 1. For example, as illustrated data for the conditions "Loaded" and "Empty" are turned on, and will retrieve relevant data for those two states. Also, the switches for "Load", "Dump" and "Haul" are turned on, and will display data for those particular zones.

Furthermore, the data retrieved for analysis may be selected for a particular period of time. The user interface 100, may have a user affordance 134 that allows the system to receive a selection of a period of time, such as a window of time, numbers of particular dates, specified dates, etc.

An asset list for relevant mobile assets in a selected area may be displayed. The system will dynamically present in a list view 130 of the asset in the user interface, or may individually display the assets on the map or aerial images. The user interface provides an option to select/or deselect the respective assets of interest. In the example, 8 vehicles are listed. The user interface allows for a deselection/selection of all assets, or the deselection/selection of individual assets. If an asset is removed from the selection, then the represented idle cluster representation will be adjusted to reflect that the particular asset is no longer included in the idle cluster representation.

Figure 3:
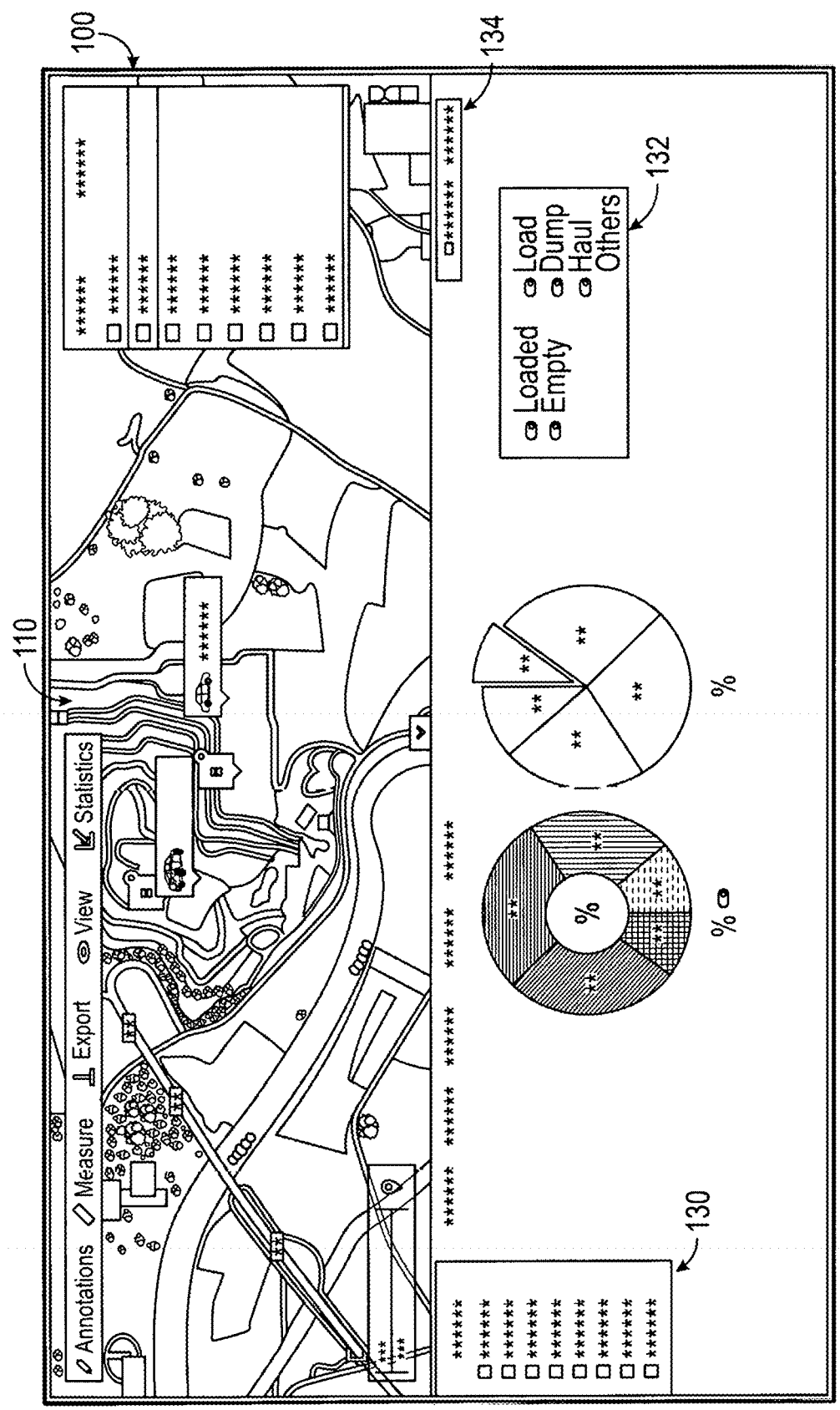
FIG. 3 illustrates an exemplary user interface.
Figure 4:
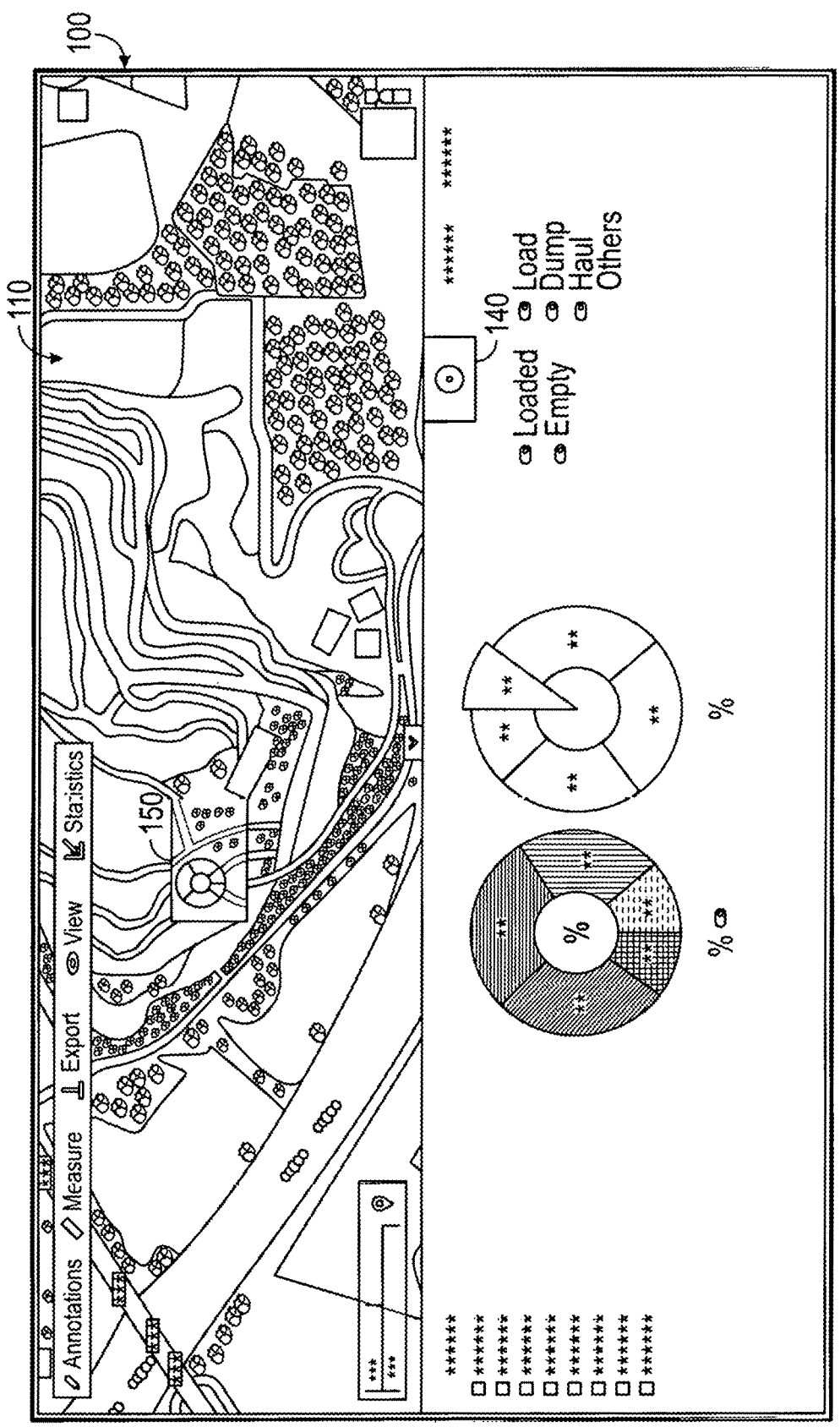
FIG. 4 illustrates an exemplary user interface.

Referring to FIG. 2, represents for the assets of interests, a representation of the percentage of the total time for a selected time period that the assets are idle. Referring to FIG. 4, the user affordance 140 allows the user to toggle the interface from an individual asset view as shown in FIGS. 2 and 3 to an aggregate idle cluster representation 150 view. As an example, the assets included in a particular area (e.g., an area selected by a user, an area of a particular radius, an area associated with a type of action, and so on) may be grouped (e.g., clustered) together, and idleness information determined based on the grouped assets.

Figures 5A, 5B:
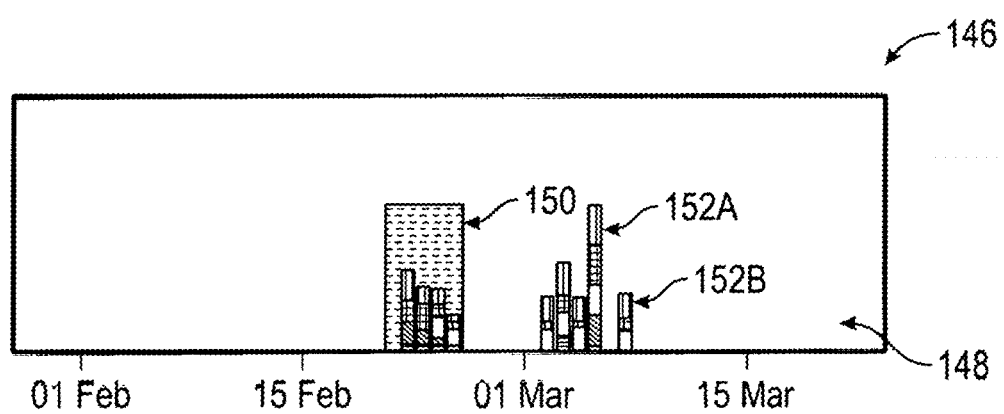
FIG. 5A illustrates a legend describing color-coded time values for vehicle idle times.
FIG. 5B illustrates a searchable chart for showing idleness on a time line.

Referring to FIG. 5A, a legend may be presented that displays an indication of the amount of time of idleness of assets. For example, the legend shows in various colors assigned to idle time, as: undefined, less than 1 minute, between 1 and 3 minutes, between 3 and 6 minutes, between 6 and 9 minutes, and greater than 9 minutes. These time values and assigned colors may be adjusted in a configuration window or interface allow the particular time values to be modified to suit the particular interests or needs of the user.

Referring to FIG. 5B, a display is shown for presenting and searching event information based on a time-line. The display 146 presents a time-line 148, and daily event data is displayed. For example, columns of the bar graph 152A and 152B show two different days with respective idle information for the mobile assets (e.g., assets clustered or grouped, as described above). The display 146 has a time selector 150 which allows for selection of a period of time. As shown, the selector has chosen a time period after February $15^{th}$, and before March $1^{st}$. In response to the selection of the time period, the user interface 200 will display cluster representations (described below) for those mobile asset events within the particular selected time period. The colors presented in the columns of the display 146, correspond to the legend in FIG. 5A. Optionally, a time period associated with the time-line 148 can be modified (e.g., modified by a user), and the display can update (e.g., in substantially real-time), allowing a user to determine modifications of idleness with respect to time-period.

Figure 6:
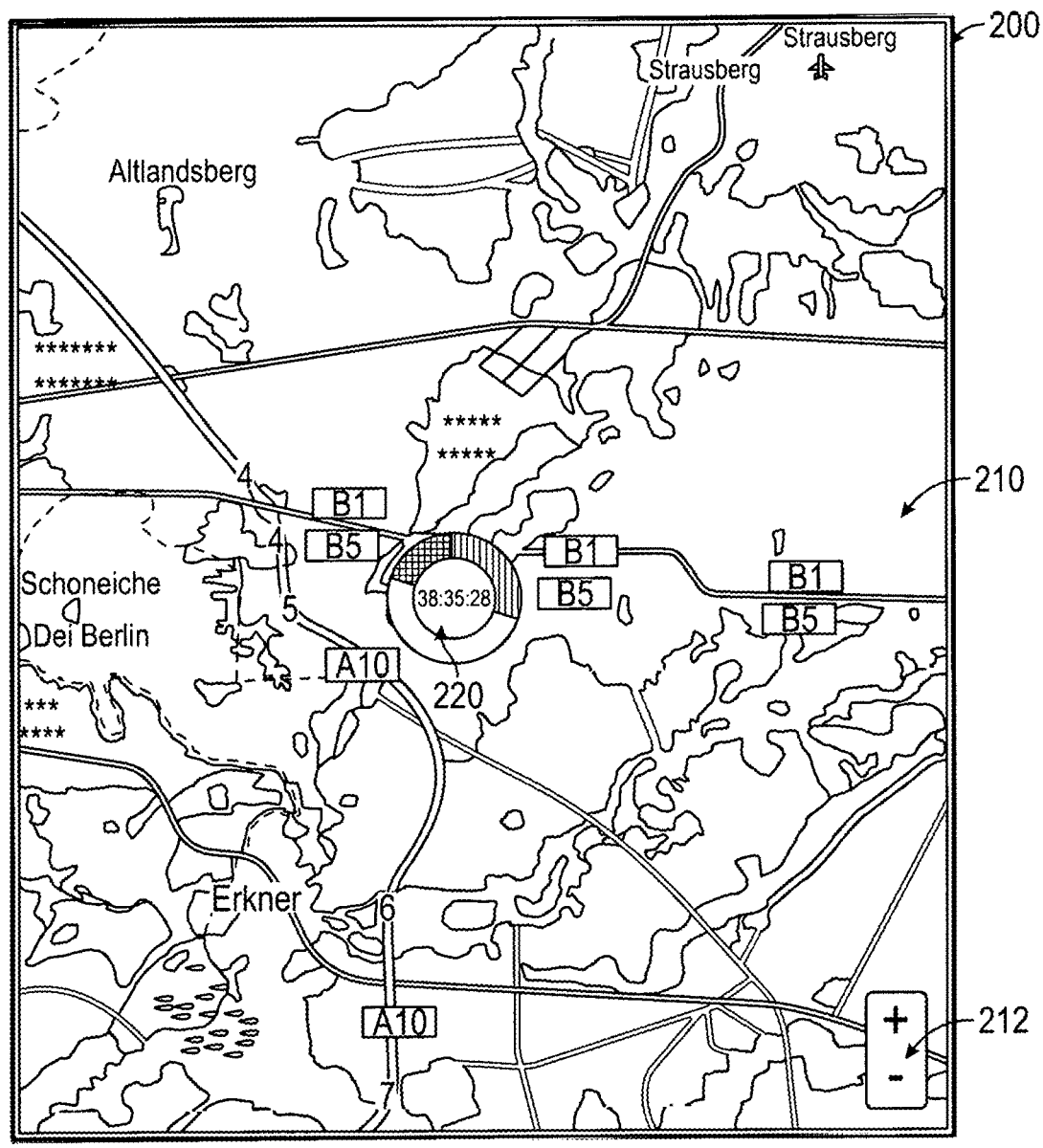
FIG. 6 illustrates an exemplary user interface of a map and idle cluster representation.

Referring to FIG. 6, an exemplary interface of the inventive system is shown. The interface 200 may display a map 210, or ortho-rectified aerial images as discussed above. The user interface may have a user affordance 212 to allow the receipt of input to control the level of detail of the map or images shown, in other words to allow the display to be "zoomed in" or "zoomed out." Additionally, the system may receive other inputs for an input device, to command the interface to adjust the level of displayed detail.

FIG. 6 show a high-level view of a geographic area. Shown in the middle of the interface is an idle cluster representation 220. As shown, the idle cluster representation 220 is displayed as a segmented colored ring with each segment of the ring indicating a different idle time for assets that are included in the idle cluster representation 220. Also, a total idle time is displayed with the idle cluster representation. In the example, a total idle time for the assets included the idle cluster representation 220 is 38 hours 35 minutes and 28 seconds. As discussed above, the calendar time for the respective data desired to be analyzed may be adjusted. In the example, the period of time may be set for 30 days prior. If the calendar time is set at 1 week prior, then likely the idle time represented would be less than 38 hours 35 minutes and 28 seconds. An example of an idle cluster representation, as described above, includes a segmented colored ring. Each segmented ring of the example idle cluster representation can be sized according to quantities of particular ranges of idle times. As an example, a first range of idle times can be less than one minute. In this first example range, a size of an associated ring can be increased based on assets being idle for less than one minute prior to being active. Similarly, a second range of idle times can be between six and nine minutes. In this second example range, a size of an associated ring can be increased based on assets being idle for greater than 6 minutes and less than nine minutes prior to being active. Optionally the idle cluster representation can be circular, or oval, and a size of a segmented ring can be represented as a portion of the circular, or oval, idle cluster representation. In this way, a user can easily ascertain particular ranges of idle times that are being most represented in the idle cluster representation.

The cluster representation shows an aggregate of the particular events of interest. As discussed above, the events each have a latitude and longitude value. The retrieved data may then be represented on a map or aerial images that have a geo-referenced coordinate system. The cluster representation 220 is presented based on a determined center or centroid location of each of the events that are part of the cluster. The system determines a central or centroid location for each of the latitude/longitude points, and displays the cluster representation near, at, or about the determined central or centroid location. As discussed above, FIG. 5B allows for a selection of information based on a time window. As the selected time period changes, the underlying data will also change for the selected time period. This will cause a shift of the cluster representation 220 about the user interface if the geo-spatial coordinates for the events are different from the first selected time period to a newly selected time period.

While not shown in a specific user interface, the system may also present a temporal based track for one or more mobile assets. The user interface may display a cluster representation for individual days. For example, the user interface may include a "play" button which, upon interaction, causes the system to display one or more cluster representatibns over a time period, duration or window. Additionally, individual mobile assets may be displayed. The would present the mobile asset moving from one event location to the next in an animated fashion. Additionally, based on the duration of the event. The mobile asset would be presented with a color represented in FIG. 5A for the duration of the event. Multiple mobile assets may be selected, for example via the Asset selection control 130, and the user interface would display icons representing those vehicles moving about the user interface to different latitude/longitude locations, with their respective colors changing based on the time duration of the respective event.

Figure 7:
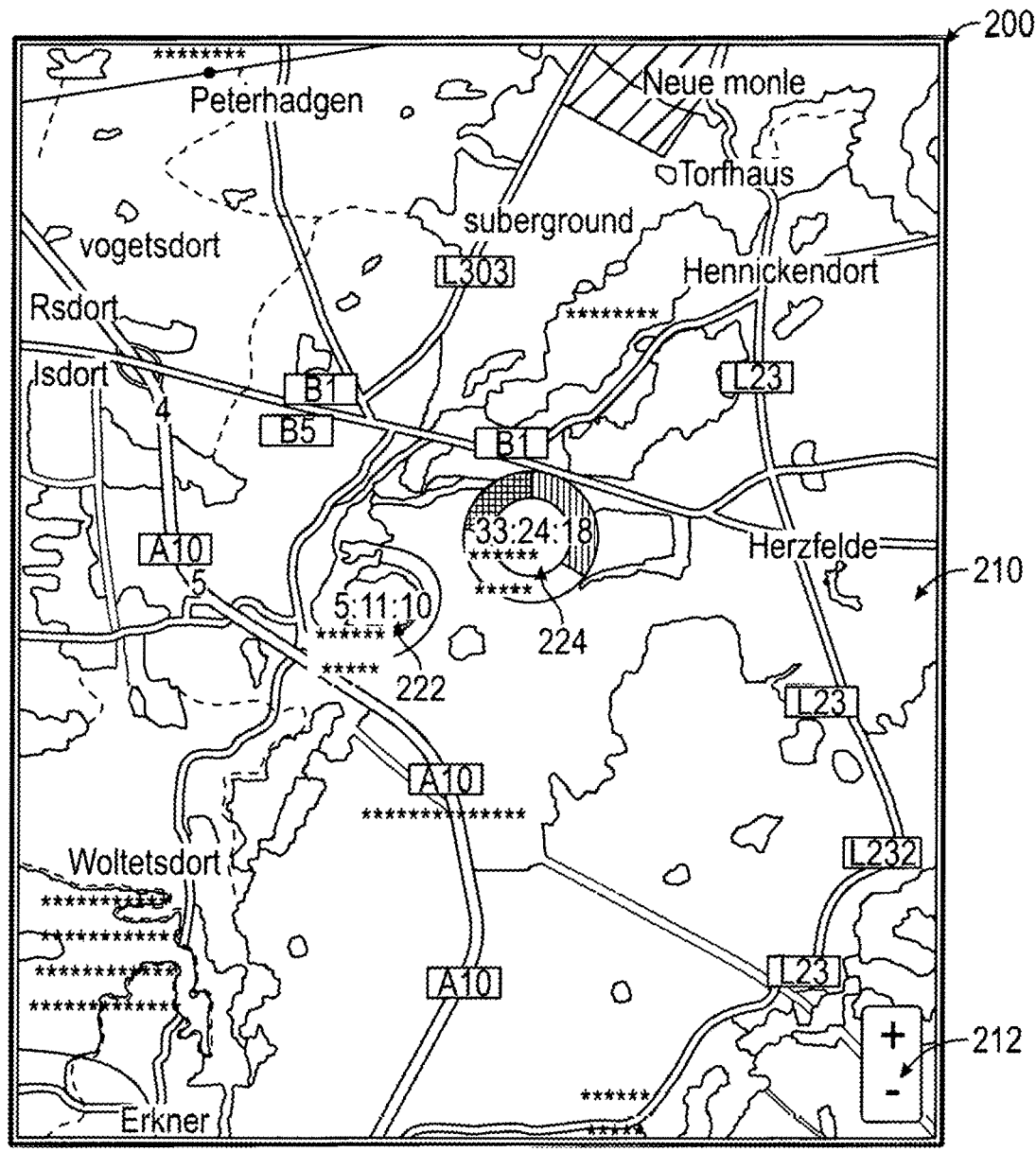
FIG. 7 illustrates an exemplary user interface of a map and two idle cluster representations.

FIG. 7 illustrates the user interface showing a level of detail greater than that of the interface shown in FIG. 6. Based on the level of detail of the display, the system will separate the idle cluster representation into grouping based on the respective locations of the assets. For example, the user can zoom in on the user interface presented in FIG. 6. Now presented are idle cluster representations 222 and 224. Idle cluster representation 222 showing a total time of 5 hours, 11 minutes, and 10 seconds. Idle cluster representation 224 shows a total time of 33 hours, 24 minutes, and 18 seconds. The combined total time of idle cluster representation 222 and 224 is 38 hours, 35 minutes, and 28 seconds.

Figure 8:
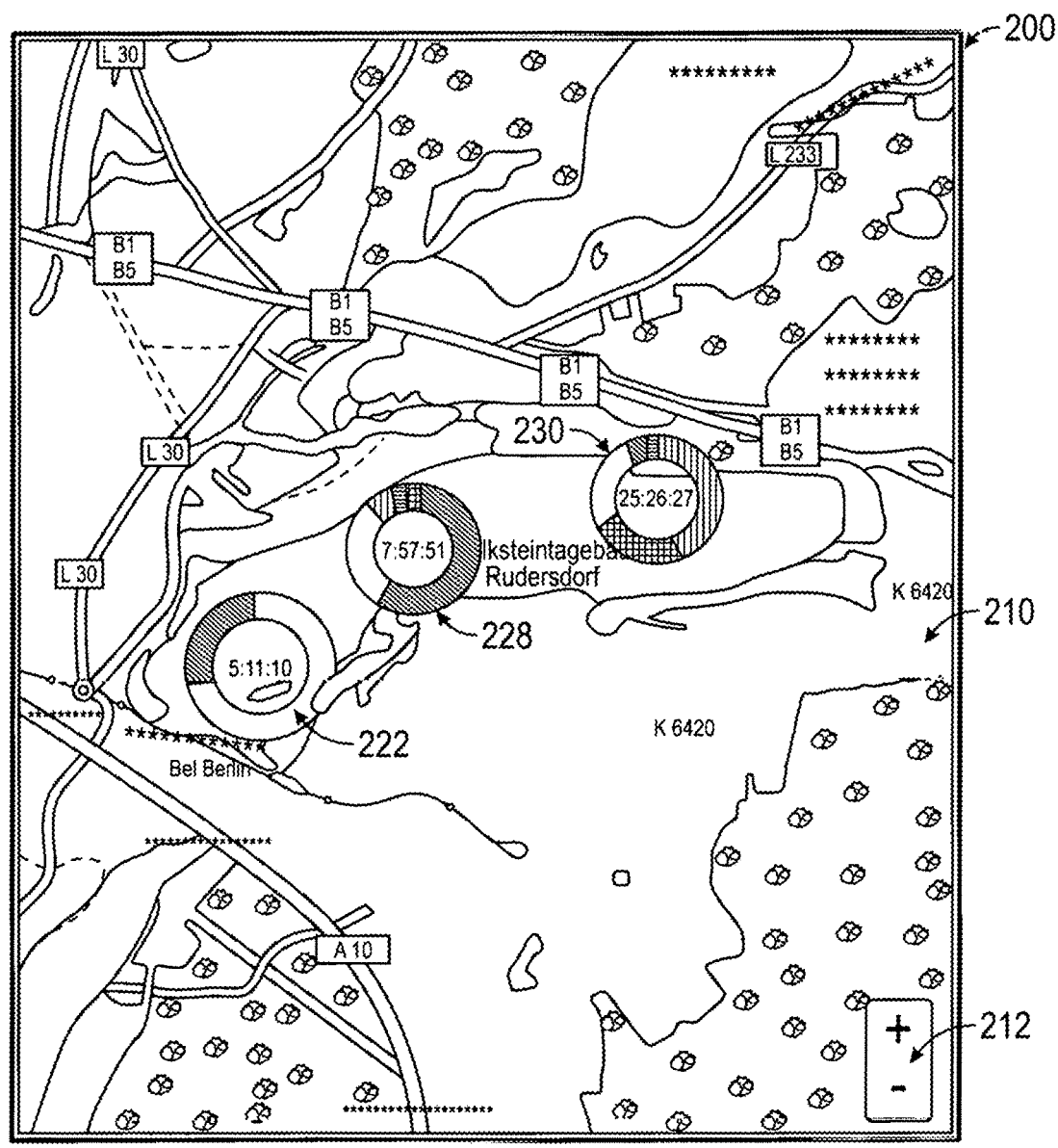
FIG. 8 illustrates an exemplary user interface of a map and three idle cluster representations.

Referring to FIG. 8, the user interface is further zoomed into, showing a level of detail greater than that of the interface shown in FIG. 7. The same idle cluster representation 220 is still displayed, but the idle cluster representation 224 of FIG. 7, is now divided into two new idle cluster representations 228 and 230. The idle time displayed of idle cluster representation 228 is 7 hours, 57 minutes, and 51 seconds. The idle time displayed of idle cluster representation 230 is 25 hours, 26 minutes, and 27 seconds. These total idle time of idle cluster representations 228 and 280 is 33 hours, 24 minutes, and 18 seconds. That is, as the user interface is zoomed in, or zoomed out, the system can update the idle cluster representation, including segmenting into multiple idle cluster representations.

Figure 9:
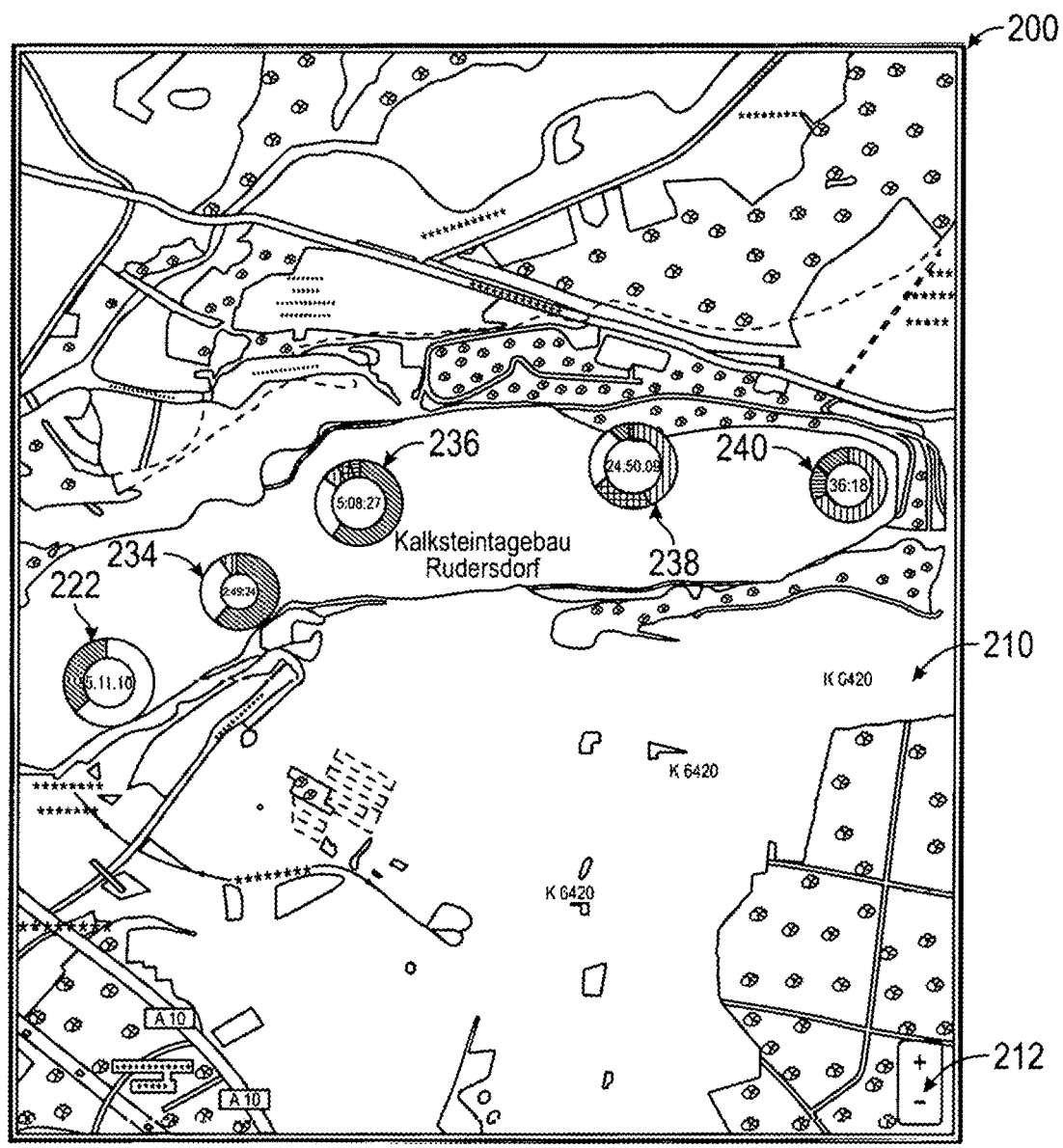
FIG. 9 illustrates an exemplary user interface of a map and five idle cluster representations.

Referring to FIG. 9, the interface is further zoomed into, showing a level detail greater than that of the interface shown in FIG. 8. Idle cluster representation 222 remains the same. But now idle cluster representation 228 of FIG. 8 is now represented as two additional idle cluster representation 234 and 236.

Figure 10:
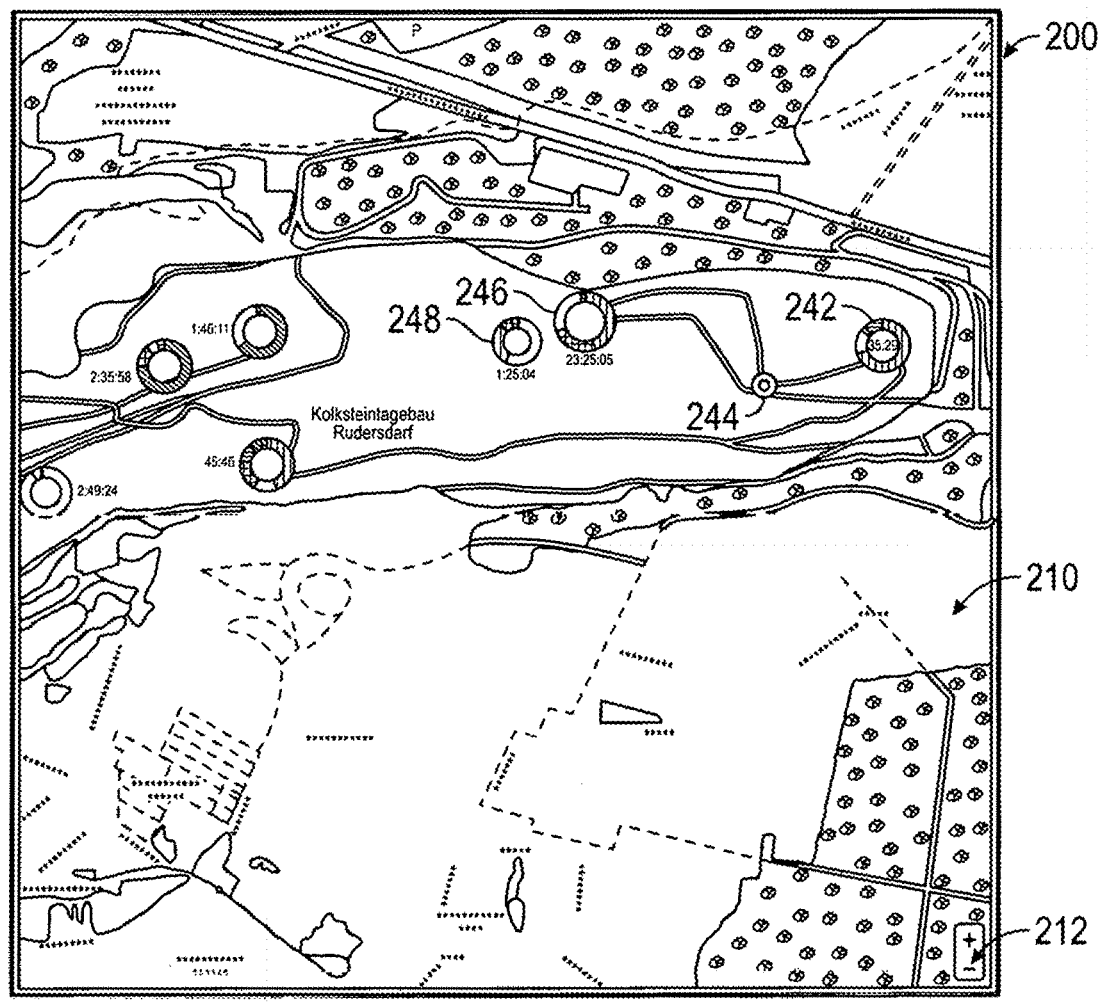
FIG. 10 illustrates an exemplary user interface of a map and six idle cluster representations, and a vehicle representation.

FIG. 10 illustrates the interface further zoomed into a more detailed level that that of FIG. 9. Again, the idle cluster representation may be divided based on the locations of the underlying assets that are part of the idle cluster representation. When the level of detail is zoomed into a particular level, individual assets may be displayed, such as the vehicle 224 shown next to idle cluster representation 242. The vehicle 224 is represented by an asset icon to display the particular type of asset. While not shown, Table 1 may include an asset type, and the asset type may be displayed with a particular icon associated to the asset type. In the example, a vehicle asset, in this case, a dump truck is shown. The icon of the individual asset is displayed in the color of the idle time associated to the for the idle time value. In the example, the asset icon is displayed in blue, which would represent an idle time of less than 1 minute.

Now referring to FIG. 11 A, an exemplary user interface 200 is with three idle cluster representations 242, 246 and 248, and an asset icon 244. The interface allows for additional information to be displayed via the user interface for the respective idle cluster representations and asset icons. As shown, a window or other display 250 may be shown that provides additional information associated with the idle cluster representation. The system calculates the values for total idle time, number of events, a maximum idle time, a minimum idle time, and an average idle time. The display 250 shows that for the idle cluster representation 242, the aggregate group of vehicles is determined to have a total idling time of 35 hours and 29 minutes. The number of events that make up the idle cluster representation is 11. The maximum idle time for one of the assets is 25 minutes and 6 seconds. The minimum idle time for an asset is 37 seconds. The average idle time for the assets is 3 minutes and 14 seconds. The information shown may include all, some or a combination of the values, or additional values associated with a summary of the grouped assets.

Figure 11A:
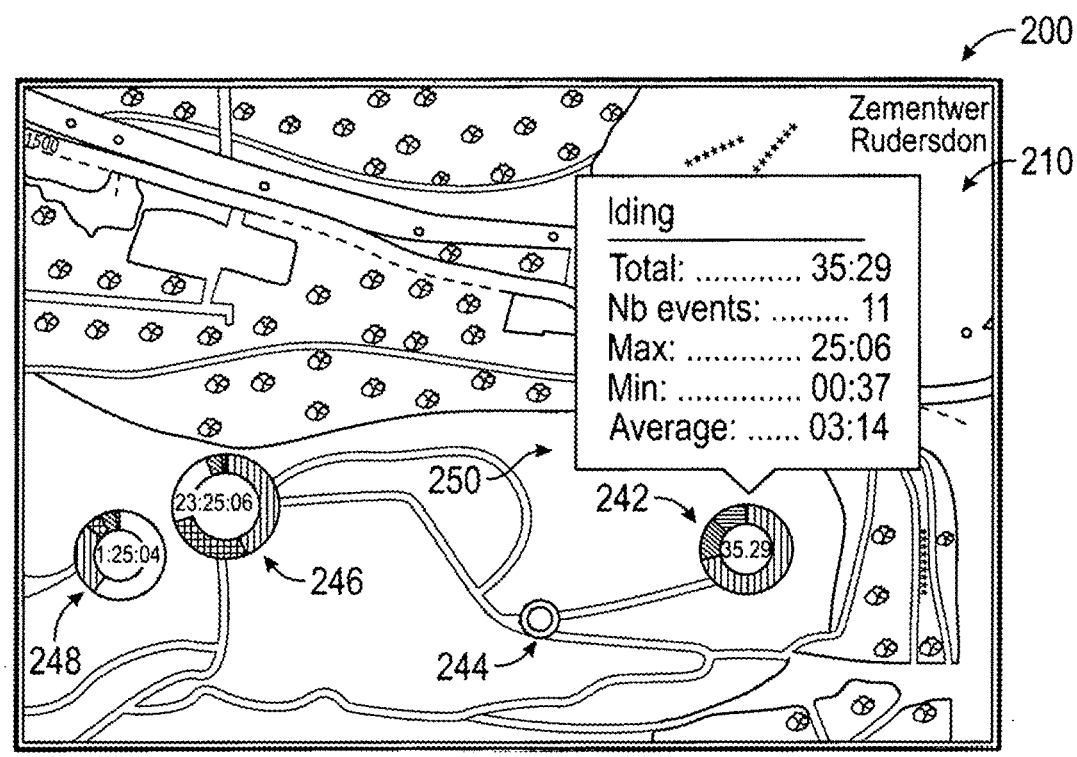
FIG. 11A illustrates an exemplary user interface of a map and three idle cluster representations, a summary of one of the idle cluster representations, and a vehicle.
Figure 11B:
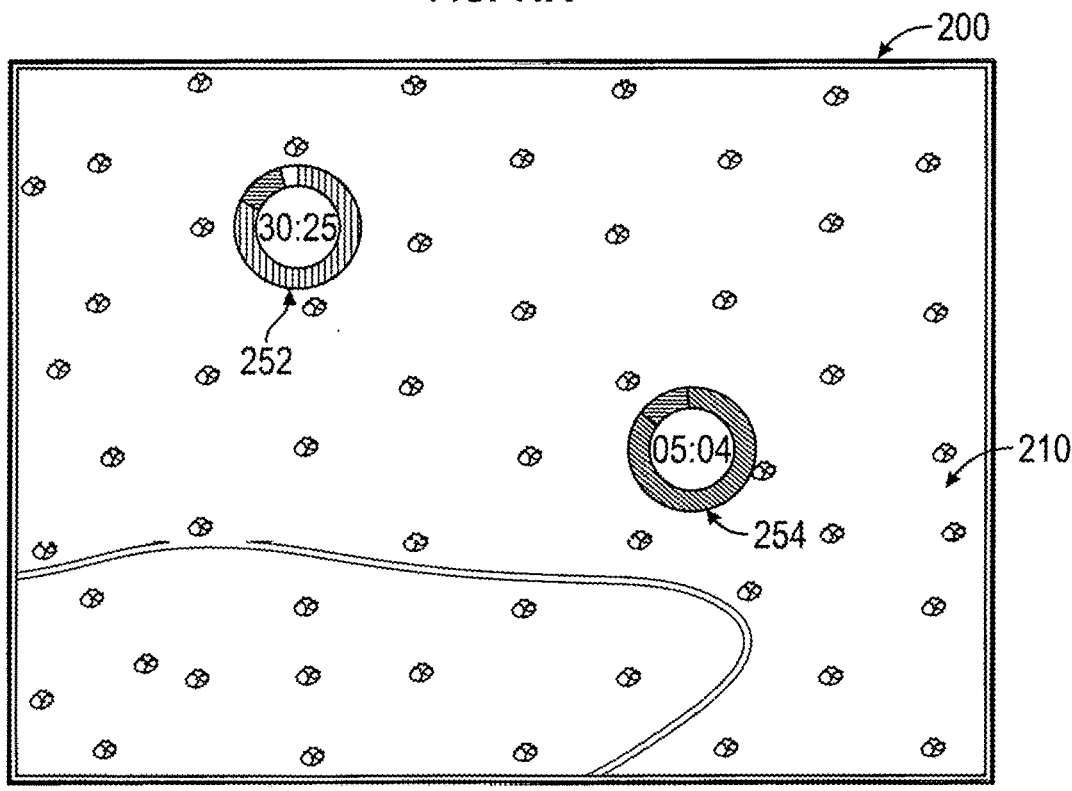
FIG. 11B illustrates an exemplary user interface of a map and two idle cluster representations.

Referring to FIG. 11B, the interface shows a zoomed in, or more detail level than that of the interface of FIG. 11A. Idle cluster representation 242 in FIG. 11A is displayed as idle cluster representation 252 and 254 in FIG. 11B.

Figure 11C:
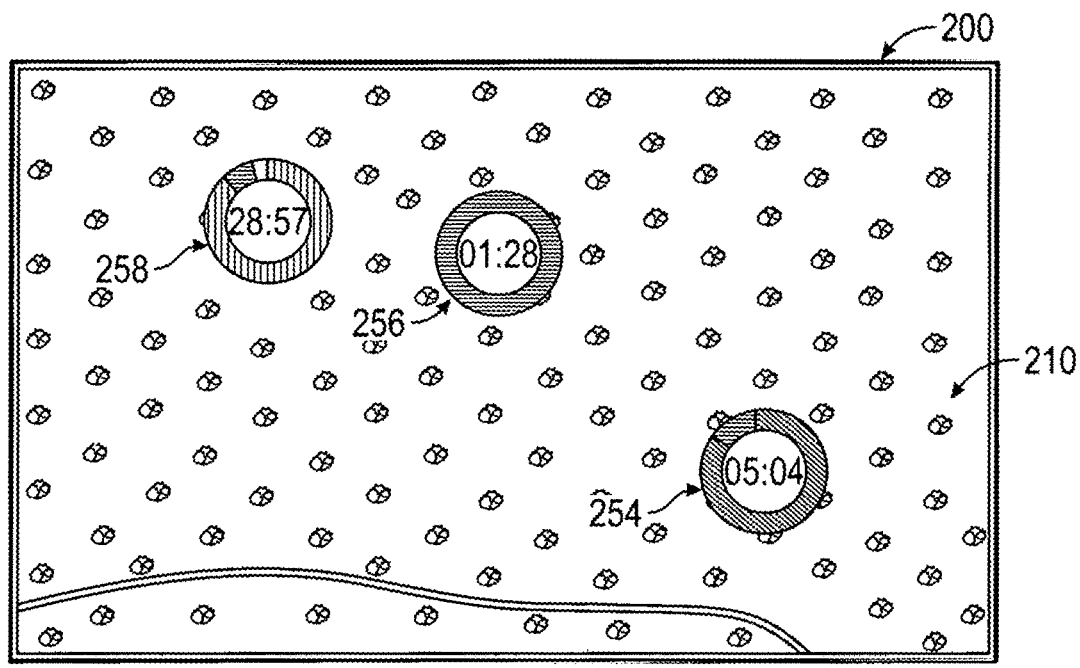
FIG. 11C illustrates an exemplary user interface of a map, and three idle cluster representations.

Referring to FIG. 11C, the interface shows a zoomed in, or more detail level than that of the interface off FIG. 11B. Idle cluster representation of 252 in FIG. 11B is displayed as idle cluster representation 256 and 258 in FIG. 11C. Note that idle cluster representation 254 remains the same and is not further divided into smaller units.

Figure 11D:
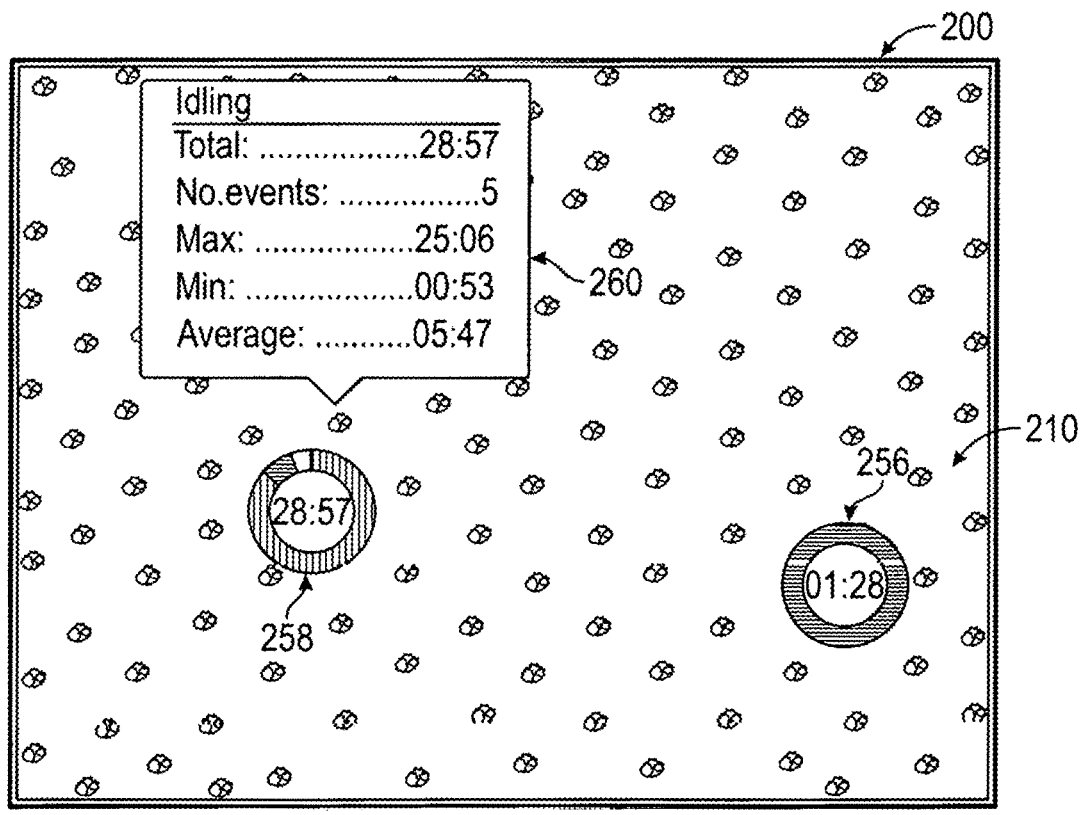
FIG. 11D illustrates an exemplary user interface of a map, and two idle cluster representations, and a summary of one of the idle cluster representations.

Referring to FIG. 11D, the interface allows for selection of information for the Idle cluster representation 258. This is similar to the discussion above as related to FIG. 11A and Idle cluster representation 242. The display 258 may be activated via the user interface with input on or over the idle cluster representation 258, such as a touch, via a touch screen, or a key board selection, or mouse pointer moved over the representation, or click on the representation.

Figure 11E:
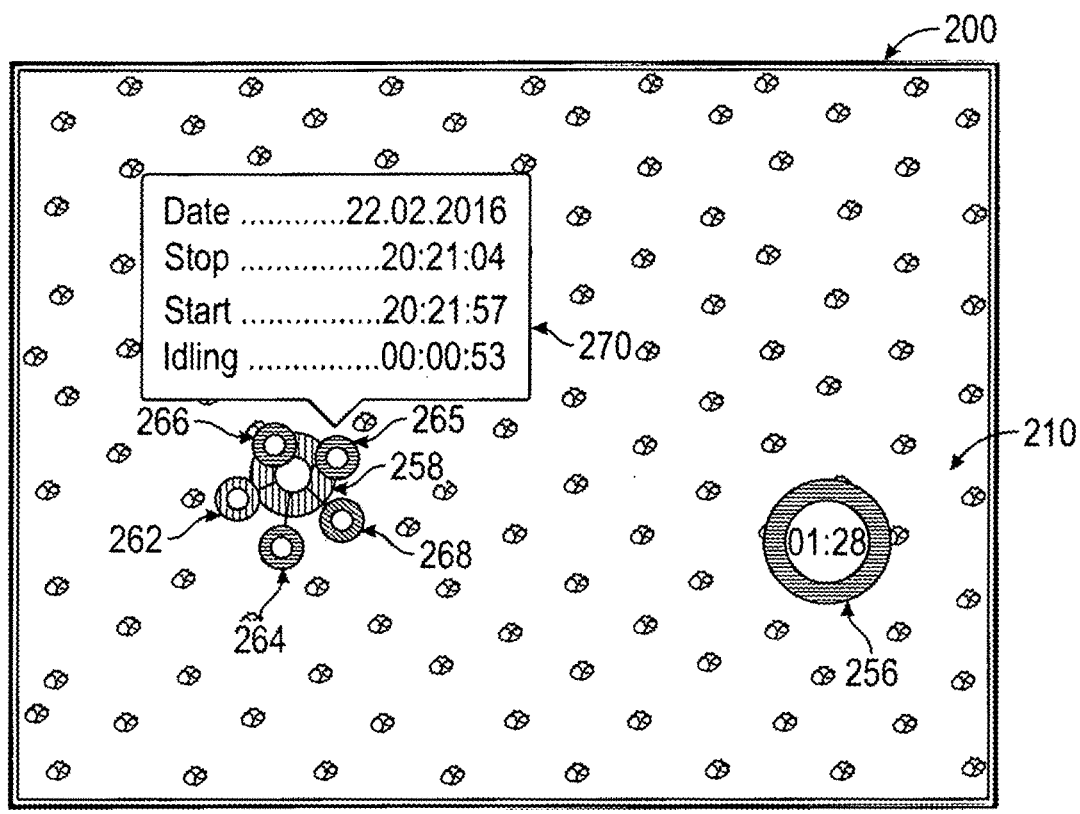
FIG. 11E illustrates an exemplary user interface of a map, and two idle cluster representations, and a spoke view of vehicles, with summary information of one of the vehicles.

Referring to FIG. 11E, the exemplary interface shows an idle cluster representation displaying individual mobile assets that the idle cluster representation includes. As shown, individual asset icons 262, 264, 265, 266 and 268 are displayed in a spoke pattern about the center of the idle cluster representation. The display 258 may be activated via the user interface with input on or over the idle cluster representation 258, such as a touch, via a touch screen, or a key board. While the spoke pattern of the individual assets is illustrated, different arrangements of the individual mobile assets may be displayed, for example, icons arranged in a spiral pattern, icons arranged in a linear row and column fashion. Additionally, the individual mobile assets may be display at their respective geo-spatial locations where an event for a mobile asset occurred.

Additionally, similar to the display of information for an idle cluster representation, individual information for as asset may be displayed. For example, display 270 shows for the asset icon 265, the date, stop time, start time, and idling time. The placement of the asset icons around the idle cluster representation 258 is based on the number of assets. The system determines the total number of assets and in one embodiment places the around the center of the idle cluster representation, and generates a line to the icon, resulting in a display similar to a hub and spoke design.

Figure 11F:
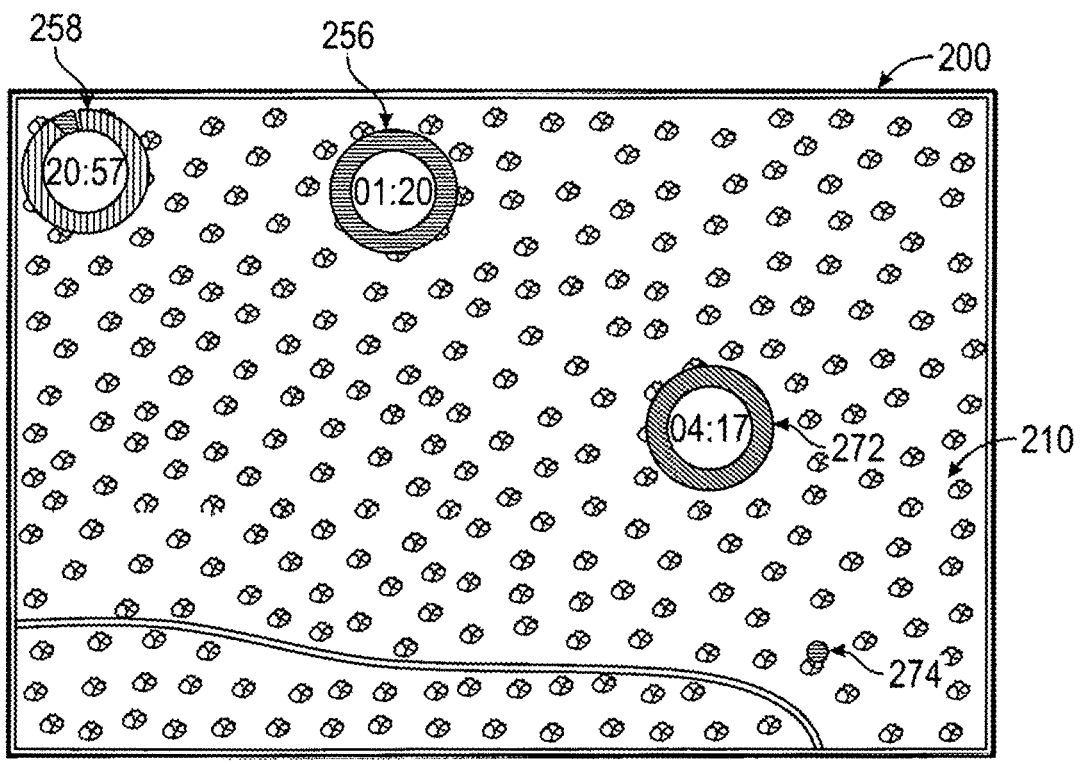
FIG. 11F illustrates an exemplary user interface of a map, and three idle cluster representations, and a vehicle representation.
Figure 11G:
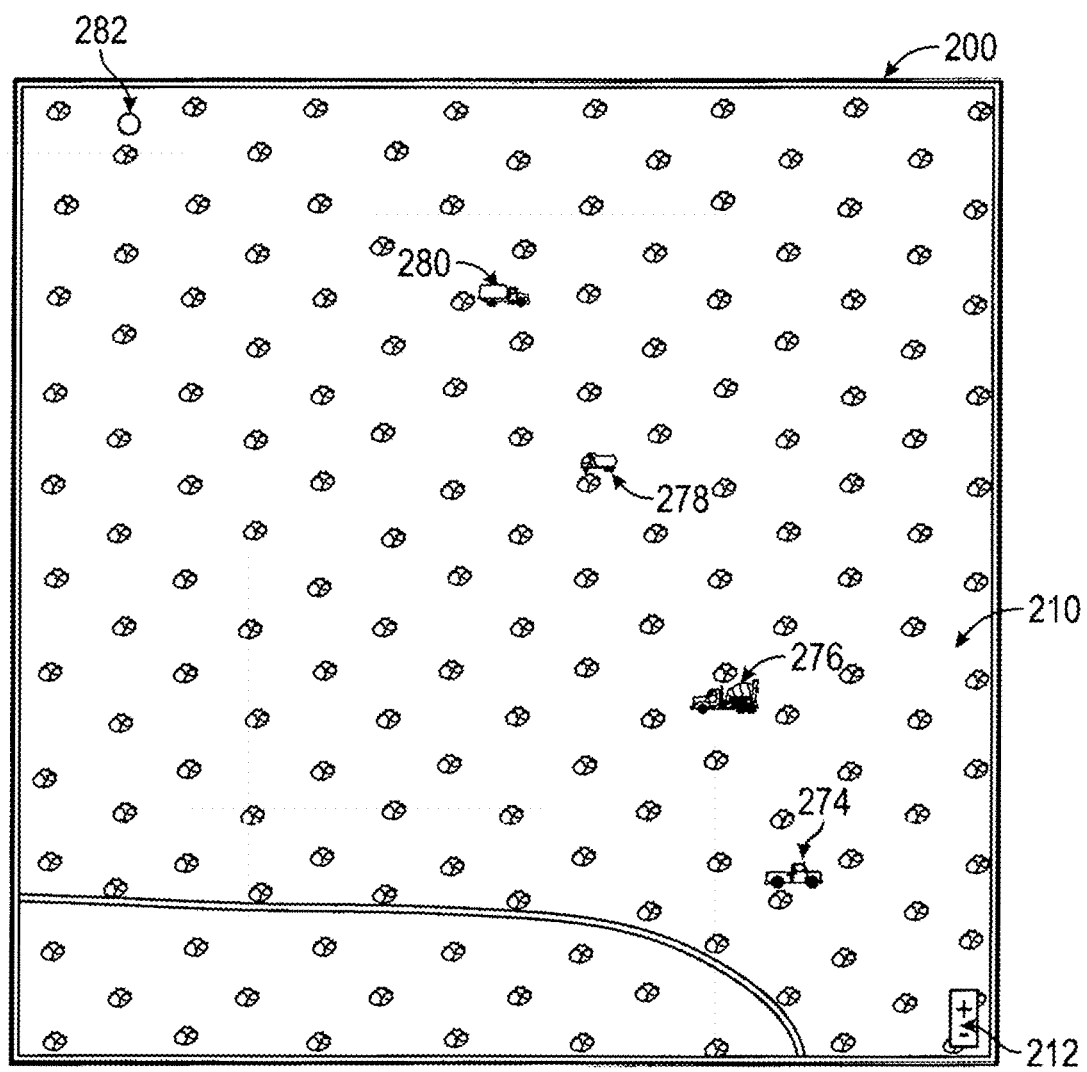
FIG. 11G illustrates an exemplary user interface of a map, and five vehicle representations.

Referring to FIG. 11F, the interface 200 shows another view of Figure E, but showing idle cluster representations 272 and individual asset icon 274. FIG. 11G represents the user interface 200 zoomed into a very detailed level. At this level of zoom, the individual assets that are represented by the idle cluster representations of FIG. 11F are displayed. For example, in both FIGS. 11F and in 11G, the user interface shows the asset icon of 274. But now, FIG. 11G also shows the assets 276, 278, 280 that are represented by the idle cluster representation 272. In FIG. 11F, the entire ring of the idle cluster representation shows a green color indicating each of the assets underlying the idle cluster representation also must be green, that is be of the same idle duration. Each of the asset icons 276, 278, and 280 represented in FIG. 11G are also green.

Figure 12:
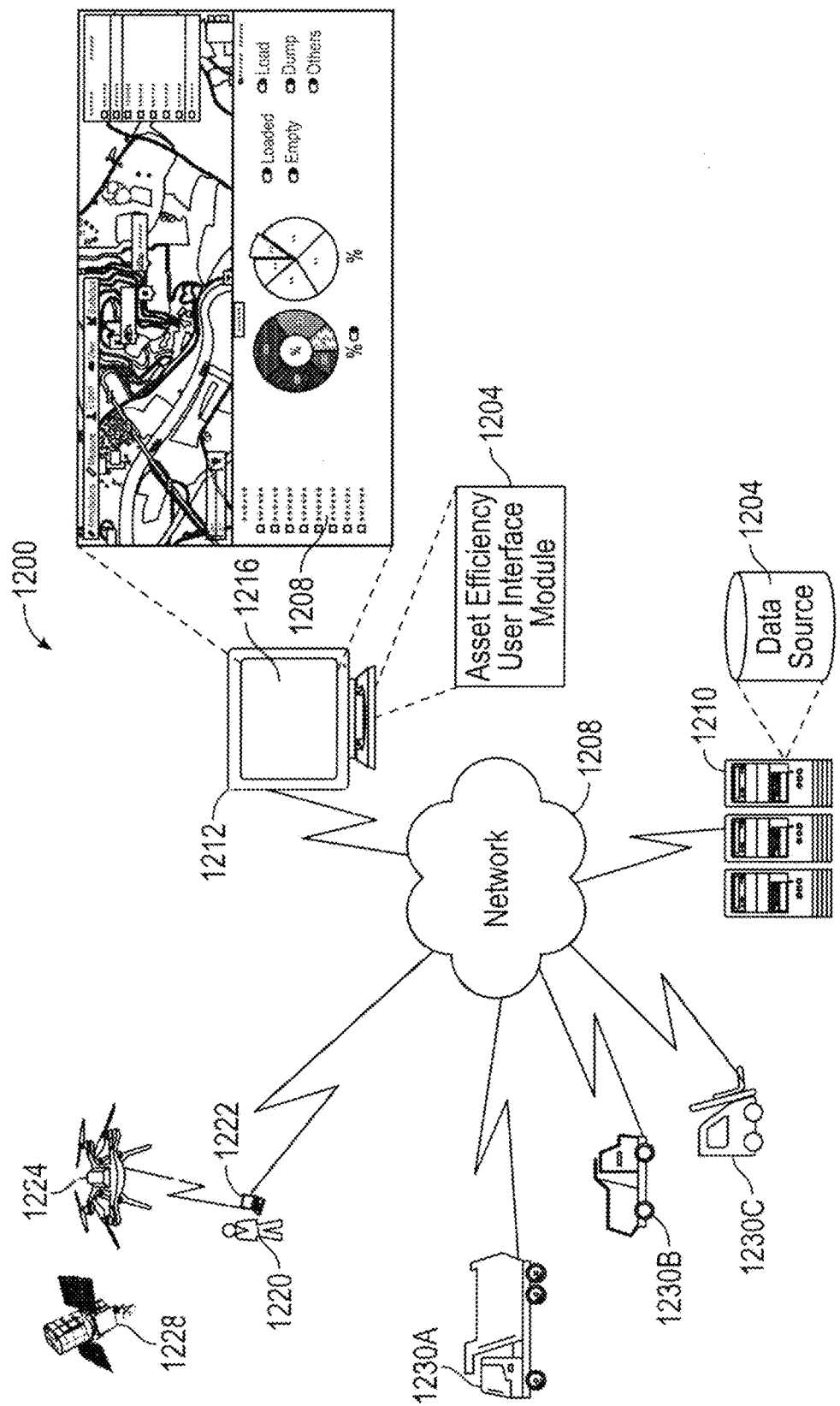
FIG. 12 illustrates an exemplary environment in which the user interface may be implemented.

FIG. 12 illustrates an example environment 1200 in which asset efficiency user interface module as described herein may be implemented. Example environment 1200 includes a data source, such as a database 1204, which may be stored at a server system 1210. A computing device 1212 may access the data source 1204 over a network 1208. Network 1208 is representative of, for example, the Internet. The computing device 1212 presents an asset efficiency user interface module 1244, which presents data from data source 1204 in the asset idleness user interface 1208 via a graphical display 1216. In an alternate implementation, the data source 1204 may be stored locally, for example, on computing device, such as a laptop computer, mobile phone, or tablet device.

An operator 1220 of a user device 1222 may control an unmanned aerial vehicle (UAV) 1224 to obtain aerial images of a location. The unmanned aerial vehicle receives geo-spatial information from a satellite 1228 (e.g., global navigation satellite system (GNSS) information). The UAV can utilize an onboard GNSS receiver, and obtain location information, such as ellipsoidal coordinates (latitude, longitude) in WGS84 reference system, along with altitudes of the UAV. The UAV can therefore obtain its three-dimensional location in space, and images may be associated by the UAV, or via later processing, of an image and the location of where the image was obtained.

Various mobile assets 1230A, 1230B, 1230C, such as dump trucks, fork lifts, earth moving equipment, land-based drones, have onboard sensors. These sensors obtain event information regarding a state or some other operation of the asset. The assets obtain geo-spatial information from the satellite 1228, and log the information into on-board storage of the vehicle. Additionally, the assets may use inertial navigation to obtain the position of the vehicle. The assets may be configured to wireless transmit the information, either in real-time, or read from the on-board storage, via a network 1208, to later be stored in one or more systems 1210, in a data storage 1204.

While the computing system 1212 is shown with the user interface. The assets may have a display device where the user interface 1208 is displayed. For example, a dump truck may have a monitor that displays the user interface 1208. This allows the asset to identify efficiency usage. If the interface is present by an asset vehicle display, the system may be configured such that the asset serial number may be used to present efficiency information associated with the particular asset. The asset location-based event information and the aerial information are presented together in the user interface 1208.

The system may be further configured to determine geographic areas where mobile asset inefficiencies are occurring. For example, using the aerial images obtained by a UAV, a digital surface model of an area may be generated. They system may analyze the event data for the mobile assets in comparison to 3-dimensional surface structures, and identify those structures via the user interface. For example, the system may determine that a geographic area exists where idleness for multiple vehicles is occurring. This can be done by analyzing the geo-spatial location of the mobile asset events, and the particular state and duration of the state. It may be found that vehicles are idling more often in a specific area than others. The system may compare the specific area with the digital surface model, and highlight or identify that a geo-graphic structure is causing the mobile assets to be idle. For example, using the aerial imagery the system can identify a narrow single-use road as the cause of where the vehicles are idling. For instance, vehicles have to wait for other vehicles to use the road. The system may suggest widening the road, or making modifications to other geo-graphic structures if they are at or near a location of where vehicles are determined to be idling.

Optionally, the system can utilize sensor information obtained from the vehicles, for example the system may correlate idleness at particular geographic areas with sensor information indicating a reduction in fuel efficiency of vehicles. The reduction can indicate that portions of the geographic area are causing difficulty for the vehicles, and therefore to improve efficiency the geographic area may be modified. The aerial images obtained by a UAV can be utilized to analyze the geographic area to determine a cause associated with the reduction.

Additionally, the system can optionally predict portions of geographic areas as included in images obtained from a UAV that may be associated with idleness. For example, as described above it may be found that vehicles are idling in a specific area. The system can analyze the specific area, and determine whether other portions of a same geographic area include features similar to the features of the specific area. In this way, the system may indicate that if vehicles will, in the future, be traveling in the specific area, they may exhibit idleness. The system can therefore present suggestions to a user, and the user can fix any idleness issues prior to them occurring (e.g., a road can be widened).

Various types of UAVs may be used to implement one or more of the features described herein (for example, a fixed wing airplane, helicopter, a multi-rotor vehicle (e.g., a quad-copter in single propeller and coaxial configurations), a vertical takeoff and landing vehicle, lighter than air aircraft). A multi-rotor vehicle in a coaxial configuration may use the same propeller pitch and diameter propellers, use different pitch and diameter propellers, or variable pitch propellers. In this specification, UAVs, such as drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload (e.g., any hardware, software, module, and so on, that is not critical to the flight operation of the UAV), can include any device that captures real-world information, including cameras, radiation measuring instruments, distance detectors such as Lidar, and so on.

Of particular interest is the use of aerial images obtained by a UAV and using a software program to generate digital surface models, point clouds, or ortho-rectified images. For example, software such a Agisoft PhotoScan or Pix4D mapper may be used to create a point cloud from the aerial images. An orthomosaic may include the obtained images, which have been combined or stitched together, and the orthomosaic may assign location information to points within the orthomosaic. The location information can be substantially accurate according to the accuracy of a ground control point marker, and GNSS, altitude sensors, readings as the UAV navigates about the geographic area.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid-state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

In general, the terms "engine" and "module" as used herein refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module or block is necessary or indispensable. The novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of the disclosure. The foregoing description details certain embodiments. It will be appreciated, however, that no matter how detailed the foregoing appears in text, the embodiments can be practiced in many ways. As is also stated above, it should be noted that the use of particular terminology when describing certain features, embodiments, and so on, should not be taken to imply that the terminology is being redefined herein to be restricted to including any specific characteristics of the features, embodiments, and so on, with which that terminology is associated.

What is claimed is:

1. An apparatus, comprising:
    one or more non-transitory storage media storing instructions that, when executed by one or more computer processors, cause the one or more computer processors to:
    access aerial images captured using an unmanned aerial vehicle, the aerial images depicting one or more mobile assets;
    obtain idle time information associated with the one or more mobile assets, the idle time information comprising geo-spatial locations at which the one or more mobile assets are identified;
    compare the geo-spatial locations against a digital surface model generated based on the aerial images, the digital surface model including surface structures consisting of one or both of natural objects or infrastructure objects;
    based on the comparison, determine one or more of the surface structures as respective causes of a subset of the one or more mobile assets being idle;
    aggregate the idle time information associated with the subset of the one or more mobile assets into a first cluster and the idle time information associated with other mobile assets of the one or more mobile assets into a second cluster; and
    present, via a user interface including the aerial images, a cluster representation of each of the first and second clusters overlaying the aerial images, wherein each cluster representation includes one or more segments, each segment representing a temporal-based duration of idleness of mobile assets included in the cluster represented by a respective cluster representation.

2. The apparatus of claim 1, wherein the instructions, when executed by the one or more computer processors, further cause the one or more computer processors to:
    receive, via the user interface, an input on one of the cluster representations, wherein the one of the cluster representations presents aggregate information associated with multiple mobile assets of the one or more mobile assets; and
    in response to the input, display a representation of each of the mobile assets that are aggregated in the one of the cluster representations, wherein the mobile assets are displayed in a circular or spiral arrangement about the one of the cluster representations.

3. The apparatus of claim 1, wherein the instructions, when executed by the one or more computer processors, further cause the one or more computer processors to:
    receive, via the user interface, an input to zoom into the aerial images for a more detailed view of the images, or zoom out of the aerial images for a less detailed view of the aerial images;
    in response to the zoom into input, display one of the cluster representations as two or more separate cluster representations; and
    in response to the zoom out input, display two or more separate cluster representations as an aggregated cluster representation.

4. The apparatus of claim 1, wherein each cluster representation is represented as a circular ring with multiple color bands, or as a pie chart with multiple slices, or as a bar graph with multiple columns.

5. The apparatus of claim 1, wherein the instructions, when executed by the one or more computer processors, further cause the one or more computer processors to:
    calculate a total aggregate idle time for the one or more mobile assets that is included with the first cluster; and
    display, via the user interface, the total aggregate idle time of the first cluster.

6. The apparatus of claim 1, wherein the instructions, when executed by the one or more computer processors, further cause the one or more computer processors to:
receive an input via the user interface for navigating one of the cluster representations; and
present multiple cluster representations based on the input.

7. The apparatus of claim 1, wherein the instructions, when executed by the one or more computer processors, further cause the one or more computer processors to:
identify a presentation location of where a-one of the first cluster or the second cluster should be presented on the aerial images based on a determination of a center location or a centroid location of the geo-spatial locations of the idle mobile assets associated with the one of the first cluster or the second cluster; and
display a cluster representation of the cluster representations which represents the one of the first cluster or the second cluster in a position on the aerial images based on the identified presentation location.

8. The apparatus of claim 1, wherein the instructions, when executed by the one or more computer processors, cause the one or more computer processors to:
present, via the user interface, the idle mobile assets overlaying the aerial images.

9. The apparatus of claim 1, wherein the instructions, when executed by the one or more computer processors, cause the one or more computer processors to:
highlight, within aerial images presented via the user interface, one or more areas corresponding to the one or more of the surface structures.

10. The apparatus of claim 1, wherein the instructions, when executed by the one or more computer processors, cause the one or more computer processors to:
present, via the user interface, a suggestion to modify the one or more of the surface structures to address the respective causes of the subset of the one or more mobile assets being idle.

11. A system, comprising:
a network interface configured to receive aerial images captured using an unmanned aerial vehicle, the aerial images depicting one or more vehicles;
a display device configured to output a user interface; and
an asset efficiency user interface module configured to:
present the aerial images within the user interface;
obtain idle time information associated with one or more idle vehicles depicted within the aerial images, the idle time information comprising at least geo-spatial locations at which the one or more idle vehicles are identified;
compare the geo-spatial locations against a digital surface model generated based on the aerial images, the digital surface model including surface structures consisting of one or both of natural objects or infrastructure objects;
based on the comparison, determine one or more of the surface structures as respective causes of the one or more idle vehicles being idle;
aggregate the idle time information into multiple clusters; and
present, within the user interface, a cluster representation of each of the multiple clusters, wherein the cluster representations overlay the aerial images, and wherein each cluster representation represents a temporal-based idle amount for at least one of the one or more idle vehicles.

12. The system of claim 11, wherein the asset efficiency user interface module is further configured to:
receive, via the user interface, an input on one of the one or more cluster representations, wherein the one of the cluster representations presents aggregate idle information associated with multiple vehicles of the one or more vehicles; and
in response to the input, present, within the user interface, a representation of each of the vehicles that are aggregated in the one of the cluster representations.

13. The system of claim 11, wherein the asset efficiency user interface module is further configured to:
receive, via the user interface, an input to zoom into the aerial images for a more detailed view of the aerial images, or zoom out of the aerial images for a less detailed view of the aerial images;
in response to the zoom into input, present, within the user interface, one of the one or more cluster representation as two or more separate cluster representations; and
in response to the zoom out input, present, within the user interface, two or more separate cluster representations as an aggregated cluster representation.

14. The system of claim 11, wherein each cluster representation is represented as a circular ring with multiple color bands.

15. The system of claim 11, wherein the asset efficiency user interface module is further configured to:
calculate a total aggregate idle time for each vehicle that is included within a cluster of the multiple clusters; and
present, within the user interface, the total aggregate idle time of the cluster.

16. The system of claim 11, wherein the asset efficiency user interface module is further configured to:
receive, via the user interface, a command for navigating one of the one or more cluster representations; and
adjust the user interface to present multiple cluster representations based on the command.

17. The system of claim 11, wherein the asset efficiency user interface module is further configured to:
identify a presentation location of where a cluster of the multiple clusters should be presented on the aerial images based on a determination of a center location or a centroid location of the geo-spatial locations of the aggregated idle time information of the cluster; and
present, within the user interface, a cluster representation of the one or more cluster representations which represents the cluster in a position on the aerial images based on the identified presentation location.

18. The system of claim 11, wherein the asset efficiency user interface module is further configured to:
present, via the user interface, the idle mobile assets overlaying the aerial images.

19. The system of claim 11, wherein the asset efficiency user interface module is further configured to:
highlight, within aerial images presented via the user interface, one or more areas corresponding to the one or more of the surface structures.

20. The system of claim 11, wherein the asset efficiency user interface module is further configured to:
present, via the user interface, a suggestion to modify the one or more of the surface structures to address the respective causes of the subset of the one or more mobile assets being idle.

21. A computerized method, comprising:
displaying, via an interactive user interface, aerial images representing a geographic area, wherein the aerial images are captured using an unmanned aerial vehicle;

overlaying, within the aerial images, idleness information associated with one or more clusters of idle vehicles, wherein each cluster is positioned at a location within the geographic area based on geo-spatial locations at which the idle vehicles are identified within the geographic area, wherein one or more surface structures included in a digital surface model generated based on the aerial images are determined as respective causes of the idle vehicles being idle based on a comparison between the geo-spatial locations and the digital surface model, wherein the surface structures consist of one or both of natural objects or infrastructure objects; and responding to an input associated with modifying a zoom associated with the geographic area, wherein responding to the input includes displaying, via the interactive user interface, idleness information associated with updated clusters adjusted based on the modified zoom.

22. The computerized method of claim 21, wherein the idleness information overlaid within the aerial images comprises a representation of a cluster of idle vehicles indicating ranges of idle times of the idle vehicles.

23. The computerized method of claim 22, wherein the representation of the cluster of idle vehicles includes a circle, and wherein the representation of the cluster of idle vehicles is separated into segmented rings each assigned a range of idle times, wherein a size of each segmented rings is based on a frequency with which respective idle vehicles were idle for an assigned range of idle times.

24. The computerized method of claim 21, further comprising:

presenting, on the representation of the geographic area, a portion of the geographic area associated with an increased idleness of idle vehicles.

25. The computerized method of claim 24, further comprising:

presenting one or more suggestions to reduce idleness at the portion of the geographic area based on the one or more surface structures, the one or more suggestions each specifying a modification that can be made to the one or more surface structures.

26. The computerized method of claim 25 wherein the one or more surface structures include a road with less than a threshold width, and wherein a suggestion of the one or more suggestions specifies that the road be widened.

27. The computerized method of claim 21, wherein each cluster is positioned at a location within the geographic area based on average locations of idle vehicles associated with the cluster.

28. The computerized method of claim 27, wherein the location is a centroid of the average locations of idle vehicles associated with the cluster.

29. The computerized method of claim 24, further comprising:

highlighting, within the portion of the geographic area presented on the representation of the geographic area, one or more areas corresponding to the one or more surface structures.

* * * * *